United States Patent
Winstead et al.

(10) Patent No.: US 7,969,350 B2
(45) Date of Patent: Jun. 28, 2011

(54) METHOD AND SYSTEM FOR REDUCING A LEAKAGE COMPONENT OF A RECEIVED RADAR SIGNAL

(75) Inventors: Benjamin J. Winstead, Minneapolis, MN (US); Jason I. Formo, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 228 days.

(21) Appl. No.: 12/134,878

(22) Filed: Jun. 6, 2008

(65) Prior Publication Data

US 2009/0303103 A1 Dec. 10, 2009

(51) Int. Cl.
*G01S 7/292* (2006.01)
*G01S 7/40* (2006.01)

(52) U.S. Cl. ........... 342/198; 342/89; 342/174; 342/121
(58) Field of Classification Search ............. 342/89, 342/198

See application file for complete search history.

(56) References Cited

U.S. PATENT DOCUMENTS

| | | | | |
|---|---|---|---|---|
| 3,256,520 A | * | 6/1966 | Blitz | 342/128 |
| 3,696,429 A | * | 10/1972 | Tressa | 370/278 |
| 4,325,138 A | * | 4/1982 | Zscheile, Jr. | 375/130 |
| 4,968,967 A | * | 11/1990 | Stove | 342/165 |
| 4,970,519 A | * | 11/1990 | Minnis et al. | 342/165 |
| 5,264,855 A | * | 11/1993 | Lammers et al. | 342/159 |
| 5,387,917 A | * | 2/1995 | Hager et al. | 342/68 |
| 5,657,021 A | * | 8/1997 | Ehsani-Nategh et al. | 342/70 |
| 5,757,312 A | * | 5/1998 | Szmurlo et al. | 342/159 |
| 5,861,837 A | * | 1/1999 | Richardson et al. | 342/198 |
| 5,969,667 A | * | 10/1999 | Farmer et al. | 342/165 |
| 6,657,583 B2 | * | 12/2003 | Okamura | 342/135 |
| 6,801,153 B2 | * | 10/2004 | Rauch et al. | 342/21 |
| 7,202,812 B2 | * | 4/2007 | Krikorian et al. | 342/198 |
| 7,576,683 B2 | * | 8/2009 | Thomas et al. | 342/120 |
| 7,629,922 B2 | | 12/2009 | Winstead et al. | |
| 7,633,435 B2 | * | 12/2009 | Meharry et al. | 342/198 |
| 7,714,770 B2 | | 5/2010 | Winstead | |
| 7,808,423 B2 | | 10/2010 | Winstead et al. | |
| 2006/0273952 A1 | * | 12/2006 | Krikorian et al. | 342/198 |
| 2007/0085727 A1 | * | 4/2007 | Backes et al. | 342/68 |

(Continued)

OTHER PUBLICATIONS

U.S. Appl. No. 11/778,452, entitled "Filtering NAGC response to noise spikes," filed Jul. 16, 2007.

(Continued)

*Primary Examiner* — Thomas H Tarcza
*Assistant Examiner* — Matthew M Barker
(74) *Attorney, Agent, or Firm* — Fogg & Powers LLC

(57) ABSTRACT

Methods and systems for reducing a leakage component of a received-signal are disclosed. A transmit antenna of a radar system transmits a transmit-signal including a transmit component. A receive antenna of the radar system receives a received-signal including a leakage component and a target component. The received-signal corresponds to the transmit-signal. An overlap determination is made to determine whether the target component overlaps the leakage component and/or is received during a time when the leakage component is expected to be received. If overlap exists, a reduction leakage component (e.g., a previously determined reduction leakage component) is subtracted from the received-signal so as to produce a modified received-signal, the modified received-signal including the target component and substantially excluding the leakage component. If overlap does not exist, an estimate of the leakage component is produced and a reduction leakage component, based at least in part on the leakage component, is produced.

20 Claims, 8 Drawing Sheets

U.S. PATENT DOCUMENTS

2008/0219377 A1* 9/2008 Nisbet .......................... 375/296
2009/0232260 A1* 9/2009 Hayashi et al. ............... 375/346

OTHER PUBLICATIONS

U.S. Appl. No. 11/696,873, entitled "Methods for rapid target acquisitions in range measurement systems," filed Apr. 5, 2007.

U.S. Appl. No. 11/863,487, entitled "Method and system for obtaining in-phase and quadrature components of a signal," filed Sep. 28, 2007.

The Institute of Electrical and Electronics Engineers, Article information "A Silicon 60 GHz Receiver and Transmitter Chipset for Broadband Communications" by S.K. Floyd et al., downloaded from the World Wide Web on Apr. 17, 2008.

Floyd et al., "A Silicon 60GHz Receiver and Transmitter Chipset for Broadband Communications", "ISSCC 2006/ Session 10/mm-Wave and Beyond/10.3", 12 pages, Feb. 2006, Publisher: IEEE.

* cited by examiner

METHOD AND SYSTEM FOR REDUCING A LEAKAGE COMPONENT OF A RECEIVED RADAR SIGNAL

BACKGROUND

Radar systems are employed for a variety of uses. As an example, a radar system may be used as a range-measurement system to estimate the position of an object in motion. One example of a range-measurement system is a radar-altimeter system, which may be employed on an aircraft, for instance. A radar-altimeter system may be used to determine the altitude of an aircraft, thereby informing an operator that the aircraft is flying too low or that terrain is rising, relative to the aircraft, to meet the aircraft.

A radar-altimeter system (or radar system, more generally) typically employs one or more transmit antennas and one or more receive antennas. In operation, the radar-altimeter system may transmit a transmit-signal, via a transmit antenna, toward a target such as the ground. The radar altimeter may then receive, via the receive antenna, a received-signal. The received-signal may include a target component that includes a portion of the transmit-signal reflected off of the target and subsequently received by the receive antenna. With knowledge of the propagation speed of the transmit-signal, the system may then determine the altitude of the aircraft by measuring the time between transmitting the transmit-signal and receiving the target component of the received-signal.

The received-signal may also include a leakage component. As an example, the received-signal may include a leakage component when the receive antenna receives a portion of the transmit-signal directly from the transmit antenna. As another example, the received-signal may include a leakage component in a situation in which the transmit-signal bounces off certain non-target objects (e.g., a vehicle appendage such as a fuel tank) and the receive antenna receives a portion of the bounced transmit-signal. When the received-signal includes a leakage component, a radar system may have greater difficulty in accurately tracking targets, especially in radar-altimeter applications in which an aircraft is flying at a relatively low altitude.

SUMMARY

Methods and systems are disclosed for reducing a leakage component of a received-signal that is received at a receive antenna and/or receiver circuitry. The received-signal may comprise a radar received-signal, a sonar received-signal, an ultrasound received-signal, or another type of received-signal.

In one respect, an exemplary embodiment may take the form of a method that includes (i) transmitting a given transmit-signal via the transmit antenna, wherein the given transmit-signal includes a pulsed signal, (ii) receiving a given received-signal via the receive antenna, wherein the given received-signal includes a leakage component and a target component, and wherein the given received-signal corresponds to the given transmit-signal, and (iii) producing an estimate of the leakage component of the given received-signal and responsively producing a reduction leakage component based, at least in part, on the estimate of the leakage component of the given received-signal. In accordance with this exemplary embodiment, the method may be carried out at a radar system that includes a transmit antenna and a receive antenna.

In another respect, an exemplary embodiment may be arranged as a system that comprises (i) a transmit antenna operable to transmit a transmit-signal, wherein the transmit-signal is a pulsed signal, wherein the transmit-signal includes a transmit component that includes a transmit leading edge, and wherein the transmit leading edge corresponds to a transmit time, (ii) a receive antenna operable to receive a received-signal, wherein the received-signal includes a leakage component and a target component, wherein the target component includes a target leading edge, and wherein the target leading edge corresponds to a receive time, and (iii) a processor operable to produce an estimate of the leakage component, and to produce a reduction leakage component, based at least in part, on the estimate of the leakage component.

These as well as other aspects and advantages will become apparent to those of ordinary skill in the art by reading the following detailed description, with appropriate reference to the accompanying drawings.

BRIEF DESCRIPTION OF THE DRAWINGS

Exemplary embodiments of the invention are described herein with reference to the drawings, in which.

DETAILED DESCRIPTION

1. Overview

Figure 1:
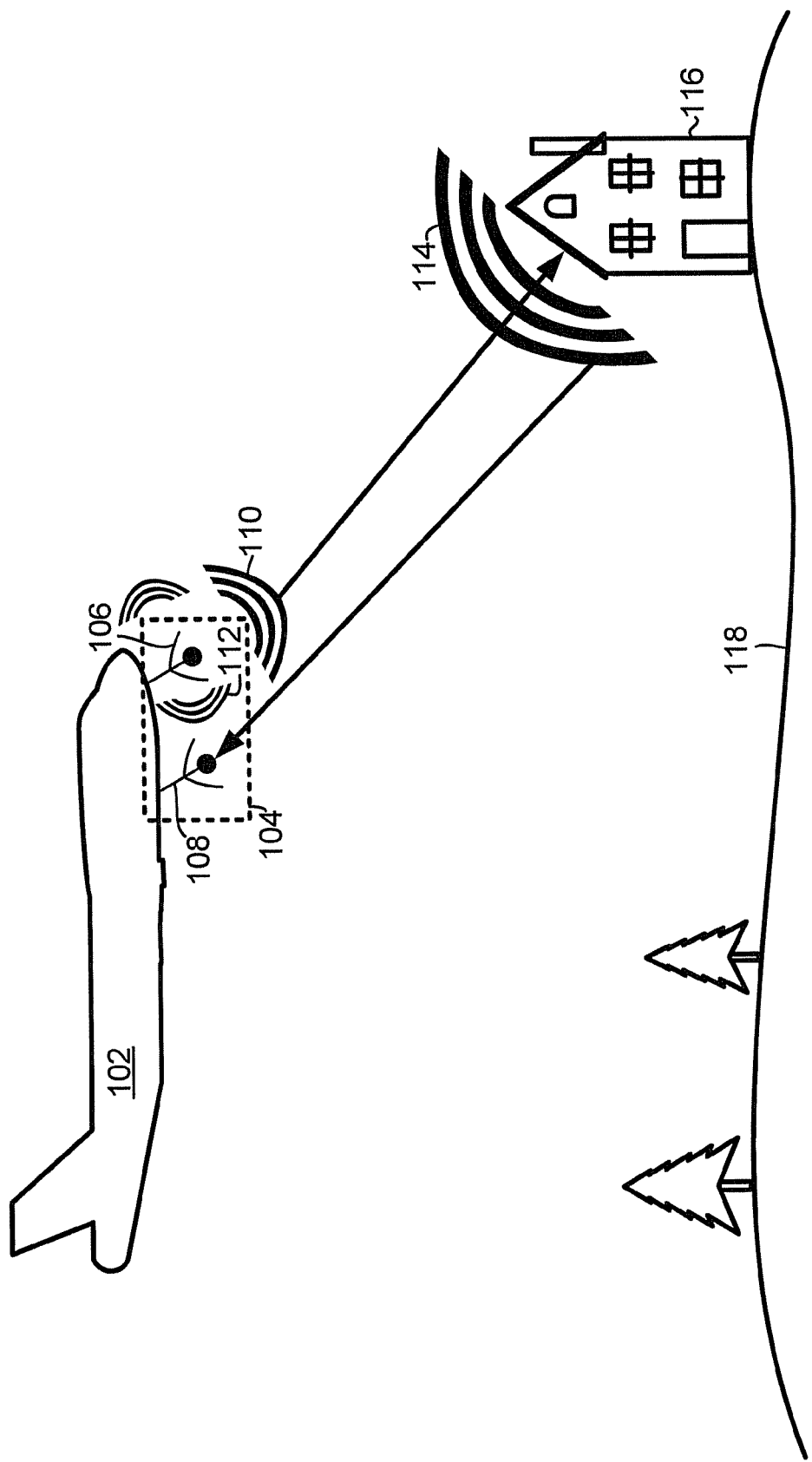
FIG. 1 is a diagram depicting a vehicle using a radar system in accordance with an exemplary method and system.

Radar systems transmit wireless radio frequency (RF) energy (e.g., a transmit-signal transmitted from a transmit antenna) and receive wireless RF energy (e.g., a received-signal received at a receive antenna).

The transmit-signal may comprise a pulsed signal that is generated by a pulse radar system, such as a coherent pulsed radar system and/or a pulse-Doppler radar system. Unlike a frequency modulated continuous wave (FMCW) radar signal that comprises a stable continuous wave of radio energy at a known modulated frequency, a pulsed signal may be defined, at least in part, by (i) a pulse repetition interval (PRI) (i.e., an inverse of a pulse repetition frequency (PRF)), and (ii) a pulse width time period that is less than the PRI. A pulse radar system may transmit radar pulses (e.g., a sine wave or a triangle wave) during the pulse width time period of each PRI.

The received-signal may comprise a leakage component and a target component. The leakage component may, for example, comprise a single instance of the transmit-signal that is reflected from a non-target, multiple instances of the transmit-signal that are reflected from one or more non-targets, and/or an instance or instances of direct receipt of the transmit-signal. The target component may, for example, comprise a single instance of the transmit-signal that is reflected from a target, multiple instances of the transmit-signal that are reflected from a single target, or multiple instances of the transmit-signal that are reflected from a respective target.

For purposes of this description, a received-signal that corresponds to a transmit-signal and/or a transmit-signal that corresponds to a received-signal indicates that the received-signal comprises at least a portion of the RF energy of the transmit-signal. The received-signal may comprise only a portion of the RF energy, for example, because the transmit-signal is attenuated prior to being received at the receive antenna as the received-signal.

Additionally, for purposes of this description, a component of a received-signal that corresponds to a transmit-signal or a transmit component indicates that the component of the received-signal comprises at least a portion of the RF energy of the transmit-signal or the transmit component. The leakage component and/or the target component of a given received-signal may include RF energy other than the RF energy of the transmit-signal.

Exemplary methods and systems are disclosed herein for reducing the leakage component of a received-signal. Reducing the leakage component may include removal of the entire leakage component or some portion of the leakage component. Reducing the leakage component allows a radar system to more accurately derive information from a received-signal, such as an aircraft's altitude. A person having ordinary skill in the art will understand that the methods and systems described herein may be arranged so that a respective leakage component of a plurality of received-signals may be reduced.

2. System Architecture

FIG. 1 is a diagram that illustrates a vehicle 102 using a radar system 104 in accordance with exemplary methods and systems described herein. Although vehicle 102 is shown as an air-based vehicle, such as a jet or airplane, vehicle 102 may be a land-based, a sea-based, or even an outer-space-based (e.g., a satellite or a space transportation system (e.g., a space shuttle)) vehicle. In alternative embodiments, radar system 104 may be located on a stationary structure, such as a building or tower or on a hand-held device. A person having ordinary skill in the art will understand that other exemplary vehicles, structures, and devices that use radar system 104 are also possible.

Radar system 104 may be arranged as a radar-altimeter system or another type of radar system. As illustrated in FIG. 1, radar system 104 includes a transmit antenna 106 and a receive antenna 108. To improve clarity of the figure, transmit antenna 106 and receive antenna 108 are not drawn to the same scale as vehicle 102.

Transmit antenna 106 and receive antenna 108 may be arranged in any of a variety of configurations. In some exemplary embodiments, transmit antenna 106 and receive antenna 108 may, for example, be separate antennas, or transmit antenna 106 and/or receive antenna 108 may each include a plurality of antennas. In other exemplary embodiments, transmit antenna 106 and receive antenna 108 may be arranged as a single antenna.

In one respect, the single antenna may connect to a circulator that includes (i) a first port that connects to transmitter circuitry (e.g., a transmitter), (ii) a second port that connects to the single antenna, and (iii) a third port that connects to receiver circuitry (e.g., a receiver). The circulator may be a passive device that is operable to route signals to be transmitted from the transmitter to the single antenna, and route received-signals from the single antenna to the receiver.

In another respect, the single antenna may connect to a switch (e.g., an active device) that is operable in (i) a first state to route signals to be transmitted from the transmitter to the single antenna, and (ii) a second state to route received-signals from the single antenna to the receiver. Triggering of the switch from the first state to the second state and from the second state to the first state may occur, for example, in response to the switch receiving a signal from a processor of radar system 104. Other exemplary arrangements of transmit antenna 106 and receive antenna 108 are also possible.

As illustrated in FIG. 1, transmit antenna 106 transmits a transmit-signal 110 towards a target 116, which is shown to be a house. Transmit-signal 110 may include radar pulses that are within the RF range. Some of the radar pulses of transmit-signal 110 may be absorbed by certain areas of the ground 118 and reflected by other areas and/or objects (e.g., non-target objects).

Receive antenna 108 receives a received-signal, which may be in the RF range. The received-signal may include a target component 114 and a leakage component 112. Target component 114 may include pulses of the transmit-signal 110 that are reflected off of target 116 and subsequently received by receive antenna 108. Leakage component 112 may include pulses of transmit-signal 110 that are not reflected off of target 116. As such, leakage component 112 may include pulses of transmit-signal 110 that are received directly by receive antenna 108 and/or received after transmit-signal 110 reflects off of non-target objects, such as vehicle appendages (e.g., fuel tanks, landing gear, missiles, missile turrets, etc.).

Figure 2:
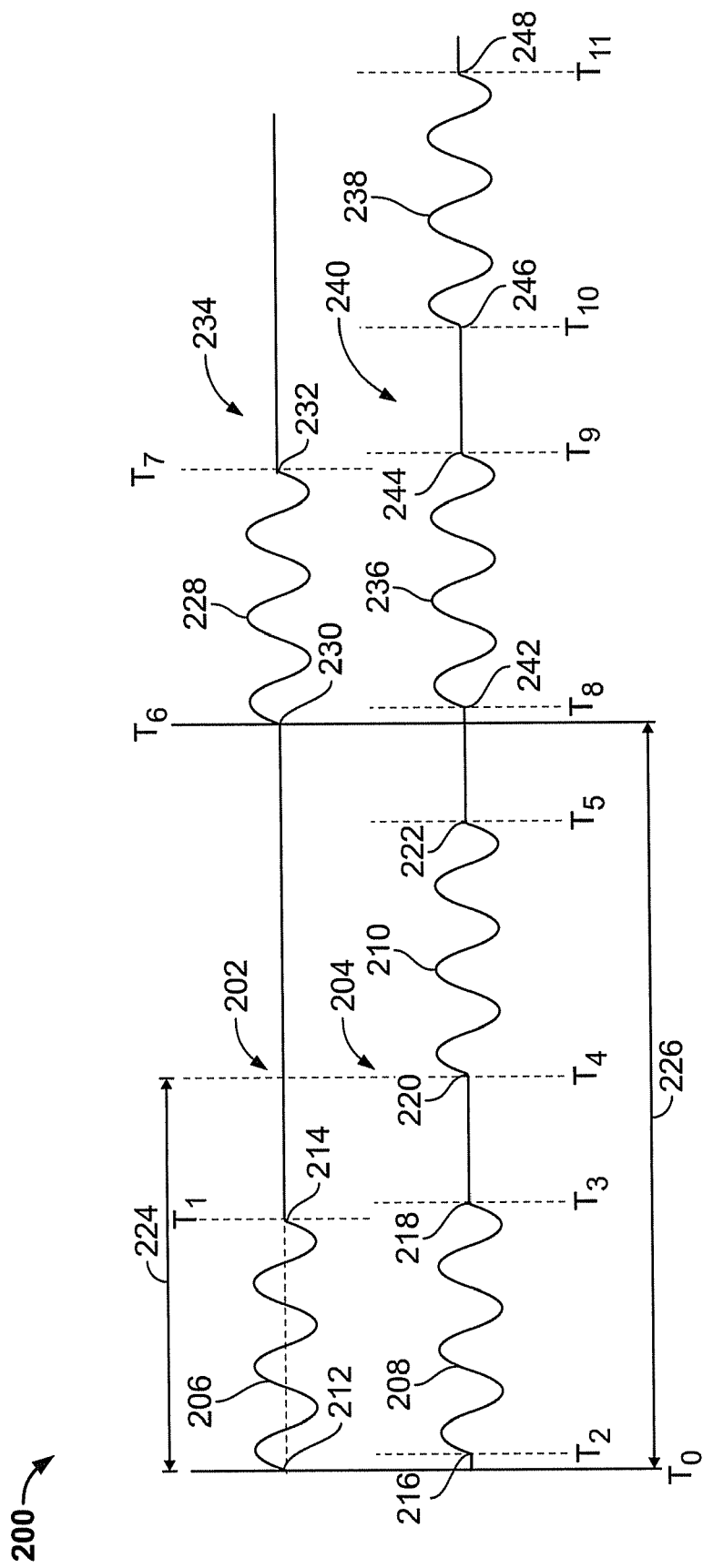
FIG. 2 is a timing diagram of transmit-signals and received-signals in accordance with an exemplary method and system.

Next, FIG. 2 is a timing diagram 200 of exemplary transmit-signals 202, 234 and exemplary received-signals 204, 240. Transmit antenna 106 may transmit transmit-signals 202, 234 and receive antenna 108 may receive received-signals 204, 240. Received-signals 204, 240 correspond to transmit-signals 202, 234, respectively.

Transmit-signal 202 includes a transmit component 206, and transmit-signal 234 includes a transmit component 228. Transmit components 206, 228 may each comprise a pulsed signal, wherein the time between $T_0$ and $T_1$ and the time between $T_6$ and $T_7$ define respective pulse width time periods of the pulsed signals. Transmit component 206 includes a leading edge 212 and a trailing edge 214. Leading edge 212 corresponds to time $T_0$, (e.g., a time when transmit component 206 begins and/or when transmit antenna 106 begins transmitting transmit component 206). Trailing edge 214 corresponds to time $T_1$ (e.g., a time when transmit component 206 ends and/or when transmit antenna 106 stops transmitting transmit component 206). Similarly, transmit component 228 includes a leading edge 230 that corresponds to time $T_6$ and a trailing edge 232 that corresponds to time $T_7$.

Received-signal 204 includes a leakage component 208 and a target component 210, and received-signal 240 includes a leakage component 236 and a target component 238. Leakage components 208, 236 may include RF energy of transmit-signals 202, 234, respectively. This RF energy may be received directly by receive antenna 108 and/or received indirectly after transmit-signals 202, 234 reflect off of non-target objects. Target components 210, 238 may include RF energy of transmit-signals 202, 234, respectively, that is reflected off of target 116 and subsequently received by receive antenna 108.

Leakage component 208 and target component 210, as well as leakage component 236 and target component 238, are not drawn using a similar scale. For example, leakage component 208 is typically greater in amplitude than target component 210, because target component 210 usually travels a greater distance and thus experiences greater attenuation than leakage component 208.

Leakage component 208 includes a leading edge 216 and a trailing edge 218. Leading edge 216 corresponds to time $T_2$ (e.g., a time when leakage component 208 begins and/or when receive antenna 108 begins receiving leakage component 208). Trailing edge 218 corresponds to time $T_3$ (e.g., a time when leakage component 208 ends and/or when receive antenna 108 stops receiving leakage component 208). Similarly, target component 210 includes a leading edge 220 and a trailing edge 222. Leading edge 220 corresponds to time $T_4$ (e.g., a time when target component 210 begins and/or when receive antenna 108 begins receiving target component 210) and trailing edge 222 corresponds to time $T_5$ (e.g., a time when target component 210 ends and/or when receive antenna 108 stops receiving target component 210).

Leakage component 236 includes a leading edge 242 that corresponds to time $T_8$ and a trailing edge 244 that corresponds to time $T_9$. Target component 238 includes a leading edge 246 that corresponds to time $T_{10}$ and a trailing edge 248 that corresponds to time $T_{11}$. Times $T_0$, $T_1$, $T_6$ and $T_7$ are transmit times. Times $T_2$, $T_3$, $T_4$, $T_5$, $T_8$, $T_9$, $T_{10}$, and $T_{11}$ are receive times.

As shown in FIG. 2, time $T_3$ occurs prior to time $T_4$. In this regard, leakage component 208 does not overlap with target component 210. Alternatively, time $T_3$ and time $T_4$ may occur simultaneously or time $T_3$ may occur after $T_4$. In the case in which time $T_3$ occurs after $T_4$, at least a portion of leakage component 208 overlaps with target component 210. As an example, $T_3$ may occur after $T_4$ during a situation in which vehicle 102 is relatively close to target 116 (e.g., when vehicle 102 is flying at a low altitude).

Transmit-signal 234 includes a transmit component 228. Transmit component 228 includes a leading edge 230 and a trailing edge 232. Leading edge 230 corresponds to time $T_6$, (e.g., a time when transmit component 228 begins and/or when transmit antenna 106 begins to transmit component 228). Trailing edge 232 corresponds to time $T_7$ (e.g., a time when transmit component 228 ends and/or when transmit antenna 106 stops transmitting transmit component 228).

The time between $T_0$ and $T_6$ defines a PRI 226. As illustrated in FIG. 2, PRI 226 is long enough in duration such that receive antenna 108 is able to receive target component 210 before transmit antenna 106 transmits transmit component 228. Alternatively, the PRI 226 could be shorter in duration such that transmit antenna 106 begins transmitting transmit component 228 before receive antenna 108 receives the entire target component 210. Additionally, the time between $T_0$ and $T_4$ defines a range 224. The range 224 may be used to determine an altitude of vehicle 102.

Figure 3:
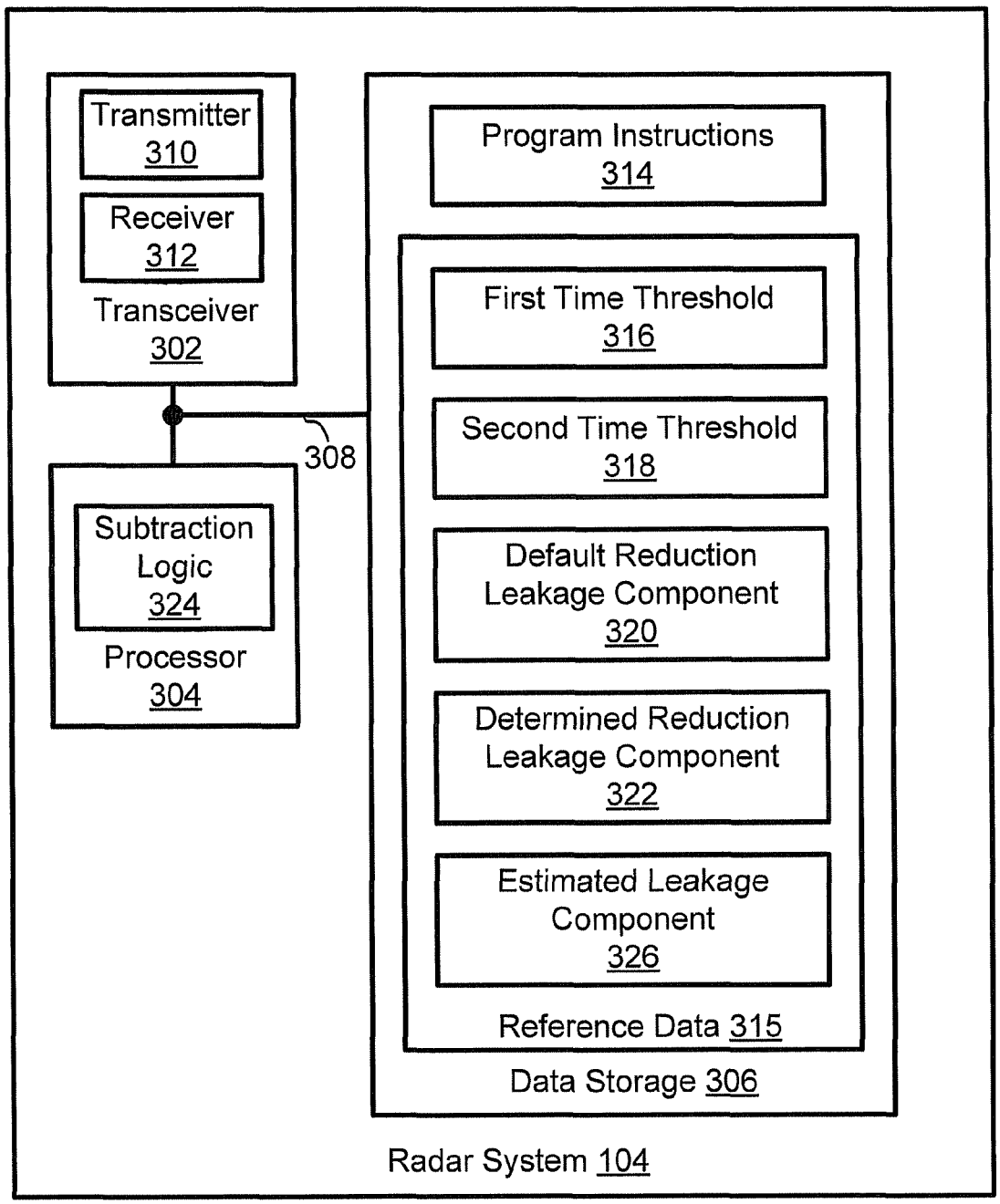
FIG. 3 is a block diagram of an exemplary radar system.

Next, FIG. 3 is a block diagram of radar system 104. Radar system 104 may include a transceiver 302, a processor 304, and data storage 306, all of which may be linked together via a system bus, network, or other connection mechanism 308. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Further, various functions described herein as being performed by one or more elements may be carried out by hardware, firmware, and/or software (e.g., computer-readable program instructions 314 that are stored at data storage 306 and are executable by processor 304).

Transceiver 302 includes transmitter circuitry (also referred to herein as a "transmitter") 310 operable to transmit RF energy, such as transmit-signals 202, 234, and receiver circuitry (also referred to herein as a "receiver") 312 operable to receive RF energy, such as received-signals 212, 240. Transmitter 310 and receiver 312 may be arranged in any of a variety of configurations. For example, transmitter 310 and receiver 312 may be contained within a single chipset. As another example, a portion of transmitter 310 and a portion of receiver 312 may be contained within a single chipset. As yet another example, transmitter 310 or a portion of transmitter 310 may be contained in a first chipset and receiver 312 or a portion of receiver 312 may be contained in a second chipset. As still yet another example, transmitter 310 may comprise transmit antenna 106, and/or receiver 312 may comprise receiver antenna 108. Other exemplary arrangements for transmitter 310 and receiver 312 are also possible.

Figure 6:
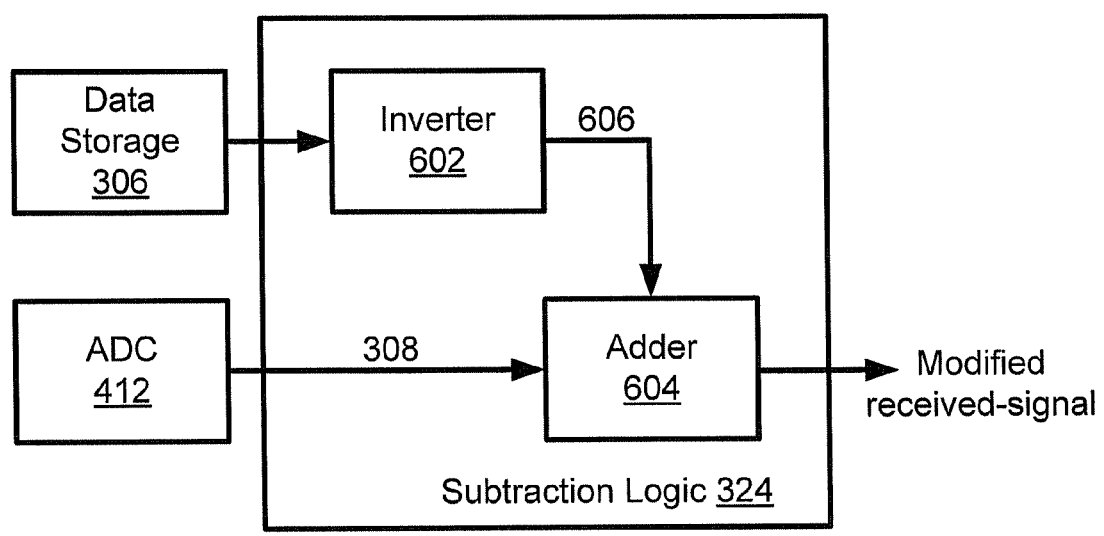
FIG. 6 is a block diagram of subtraction logic in accordance with an exemplary method and system.

Processor 304 may be arranged in any of a variety of configurations so as to carry out a variety of processing functions. As an example, processor 304 may include (i) one or more processors (e.g., one or more interrupt-driven processors that execute computer-readable program instructions 314), (ii) one or more field programmable gate arrays (FPGAs), and/or (iii) one or more application specific integrated circuits. Each of the one or more interrupt-driven processors may comprise a general-purpose processor, such as an INTEL processor, or a specialized processor, such as a digital signal processor. As another example, processor 304 may include subtraction logic 324. Details pertaining to subtraction logic 324 are shown in FIG. 6. Other examples of processor 304 are also possible.

Data storage 306 comprises a computer-readable storage medium readable by processor 304. The computer-readable storage medium may comprise volatile and/or non-volatile storage components, such as optical, magnetic, organic or other memory or disc storage, which can be integrated in whole or in part with processor 304.

Data storage 306 may, for example, contain computer-readable program instructions 314. Execution of program instructions 314 may (i) cause processor 304 to determine a power lever at which a transmit-signal (e.g., transmit-signal 202) is to be transmitted, (ii) cause transmitter 310 to transmit the transmit-signal, (iii) cause processor 304 to determine the power level of the transmit-signal, (iv) cause processor 304 to estimate a leakage component of a received-signal (e.g., received-signal 204), (v) cause processor 304 to produce a reduction leakage component, and (vi) cause processor 304 (e.g., subtraction logic 324) to subtract the reduction leakage component from a received-signal (e.g., received-signal 240) so as to produce a modified received-signal that substantially excludes the leakage component of the received-signal 240.

Substantially excluding the leakage component may include reducing the leakage component by an amount between 0 dB and 40 dB (e.g., an amount between 0 dB and 3 dB or an amount between 0 dB and 20 dB). Alternatively, substantially excluding the leakage component may include reducing the leakage component by an amount between 0 dB and some amount greater than 40 dB. Various factors, such as a sampling rate of a received-signal, may influence how much of the leakage component is reduced. For instance, increasing the rate at which the received-signal is sampled and/or increasing an intermediate frequency bandwidth may allow for reducing a greater amount of the leakage component. Other exemplary factors that influence how much of the leakage component is reduced are also possible.

Data storage 306 may also, for example, contain various types of reference data 315. At least a portion of reference data 315 may be stored at data storage 306 as default data while radar system 104 is being manufactured, whereas other portions of reference data 315 may be stored at data storage 306 after system 104 is manufactured.

Reference data 315 may include (i) data that represents sampled values of received-signals (e.g., mixed-down received-signals, filtered mixed-down received-signals, and amplified filtered mixed-down received-signals), (ii) timestamps (e.g., timestamps of times $T_0, T_1, T_2, T_3, T_4, T_5, T_6, T_7, T_8, T_9, T_{10},$ and $T_{11}$), and (iii) data associated with each stored time stamp, such as data that indicates time $T_0$ is a transmit time of a leading edge of transmit-signal 202.

Reference data 315 may also include data for determining whether to estimate a leakage component of a received-signal. As an example, reference data 315 may include a first time threshold 316 that represents an amount of time during which a received-signal may include a leakage component. For instance, first time threshold 316 may be an amount of time from a time when a leading edge of a transmit-signal is transmitted plus a given time constant and/or a number of sample times after time $T_0$. As another example, reference data 315 may include a second time threshold 318 that represents an amount of time, greater than first time threshold 316 and less than the PRI, in which it is expected that receive antenna 108 would receive the entire target component corresponding to the transmit-signal.

Reference data 315 may also include a default reduction leakage component 320. Default reduction leakage component 320 may include a plurality of default reduction leakage components. For example, each of the default reduction leakage components may be associated with a respective altitude range, such that if vehicle 102 is operating at a given altitude for which a default reduction leakage component exists in data storage 306 and for which a determined reduction leakage component 322 does not exist in data storage 306, then radar system 104 may use the default reduction leakage component associated with the given altitude so as to produce a modified received-signal. Each default reduction leakage component 320 may, for example, comprise a set of data representing a plurality of sampled values of a leakage component of a modeled received-signal.

Reference data 315 may also include a determined reduction leakage component 322. Determined reduction leakage component 322 may include a plurality of determined reduction leakage components. For example, each of the determined reduction leakage components may be associated with a respective altitude range, such that if vehicle 102 is operating at a given altitude for which a determined reduction leakage component exists in data storage 306, then the radar system 104 may use the determined reduction leakage component associated with the given altitude so as to produce a modified received-signal. Each reduction leakage component of determined reduction leakage component 322 may, for example, comprise a set of data representing a plurality of sampled values of received-signals received at receive antenna 108.

Additionally, the default reduction leakage component 320 and the determined reduction leakage component 322 may be associated with other characteristics, such as various temperatures or temperature ranges within radar system 104, various transmit-signal power levels or power level ranges, or some other characteristic. In this regard, processor 304 may detect radar system 104 is operating within a given range(s) (e.g., a temperature range and/or a transmit-signal power range) and select the default reduction leakage component or the determined reduction leakage component based on the given range(s).

Reference data 315 may also include an estimated leakage component 326. Estimated leakage component 326 may include a plurality of estimated leakage components. Each estimated leakage component of estimated leakage component 326 may, for example, comprise a set of data representing a plurality of sampled values of a received-signal. Other examples of data contained in data storage 306 are also possible.

Figure 4:
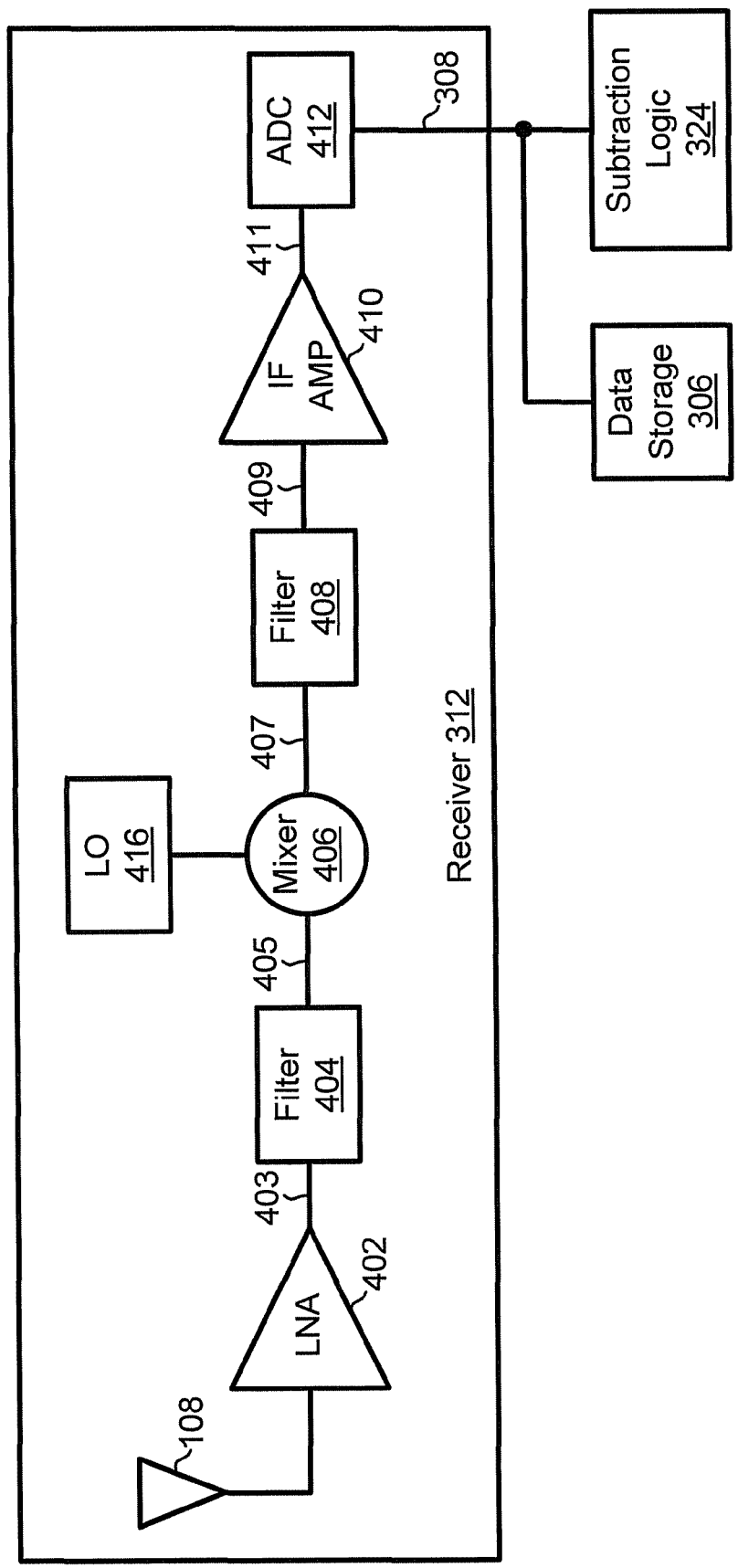
FIG. 4 is a block diagram of an exemplary receiver.

Next, FIG. 4 is an exemplary block diagram of receiver 312. As illustrated in FIG. 4, receiver 312 includes receive antenna 108, a low-noise amplifier (LNA) 402, filters 404, 408, a mixer 406, an intermediate-frequency (IF) amplifier 410, an analog-to-digital converter (ADC) 412, and a local oscillator (LO) 416. Receiver 312, and in particular ADC 412, may be connected to data storage 306 and subtraction logic 324 via connection mechanism 308 or via some other mechanism.

LNA 402 may be connected to receive antenna 108 such that the RF energy received at receive antenna 108 (e.g., a received-signal, such as received-signal 204) can be provided to LNA 402. Since a given received-signal (or at least a portion of the given received-signal) may travel over a relatively large distance prior to being received by receive antenna 108, the power of the given received-signal (or at least the portion of the given received-signal) may be attenuated as compared to the power of the RF energy that is transmitted via the transmit antenna 106 (e.g., the RF energy of transmit-signal 202). As such, LNA 402 is operable to amplify attenuated received-signals and/or portions of attenuated received-signals. LNA 402 may include an output terminal that connects to filter 404 via a connection mechanism 403 (e.g., a copper conductor). LNA 402 may produce an amplified received-signal (e.g., an amplified version of received-signal 204) and provide the amplified-received-signal to filter 404 via connection mechanism 403.

Filter 404 comprises at least one input terminal (connected to connection mechanism 403), at least one output terminal, and a filter, such as a low-pass filter, a band-pass filter, or a high-pass filter. In an embodiment in which filter 404 includes a band pass filter, the band pass filter may be arranged to pass a certain range of frequencies of the amplified received-signal (e.g., a range of frequencies centered at a center frequency of transmit-signal 202) while blocking another range or ranges of frequencies of the amplified received-signal (e.g., a range of frequencies below the lowest frequency of transmit-signal 202 and a range of frequencies greater than the highest frequency of transmit-signal 202).

The received-signal provided to LNA 402 may include noise such that the amplified received-signal produced by LNA 402 includes amplified noise. Filter 404 is operable to produce a filtered amplified received-signal that includes no amplified noise or less amplified noise than the amplified received-signal. Filter 404 is operable to pass the filtered amplified received-signal from the output terminal of filter 404 to mixer 406 via a connection mechanism 405.

Mixer 406 receives the filtered amplified received-signal. Mixer 406 may be connected to local oscillator (LO) 416 so as to be able to receive from LO 416 a signal having a given frequency (herein after "the LO frequency"). Mixer 406 may mix down the filtered amplified received-signal so as to produce a mixed-down received-signal having a center frequency that equals or is approximately equal to the frequency of the filtered amplified received-signal minus the LO frequency. The center frequency of the mixed-down received-signal (e.g., an intermediate frequency (IF)) may, for example, be approximately 100 MHz. The mixed-down received-signal may be provided from mixer 406 to filter 408 via a connection mechanism 407.

After receiving the mixed-down received-signal from mixer 406, the mixed-down received-signal may be passed through filter 408 so as to produce a filtered mixed-down received-signal. Filter 408 may pass a band of frequencies centered on the IF frequency and filter 408 may filter out any noise produced while mixing down the filtered amplified received-signal. The band of frequencies passed by filter 408 may be selected so as to prevent aliasing of a signal to be provided to ADC 412, but wide enough to pass all the information of the received-signal received at receive antenna 108. The filtered mixed-down received-signal may be provided from filter 408 to IF amplifier 410 via a connection mechanism 409.

After receiving the filtered mixed-down received-signal from filter 408, IF amplifier 410 may amplify the filtered mixed-down received-signal so as to produce an amplified filtered mixed-down received-signal. The amplified filtered mixed-down received-signal may be provided from IF amplifier 410 to ADC 412 via a connection mechanism 411.

After receiving the amplified filtered mixed-down received-signal from IF amplifier 410, ADC 412 may sample the amplified filtered mixed-down received-signal and responsively produce a sampled mixed-down received-signal (e.g., a sampled mixed-down received-signal that has passed through a filter and that has been amplified). ADC 412 may, for example, sample the amplified filtered mixed-down received-signal at a sampling rate that is at least two times the bandwidth of the amplified filtered mixed-down received-signal. Alternatively, ADC 412 may sample the amplified filtered mixed-down received-signal at a sampling rate that is less than two times the bandwidth of the amplified filtered mixed-down received-signal; however, the accuracy of the sampled mixed-down received-signal may be reduced relative to the accuracy of the sampled mixed-down received-signal when the sampling rate is at least two times the bandwidth of the amplified filtered mixed-down received-signal.

The sampled mixed-down received-signal produced by ADC 412 may be provided to data storage 306 and stored as reference data 315. In particular a portion of the sampled mixed-down received-signal may be stored as estimated leakage component 326. The sampled mixed-down received-signal produced by ADC 412 may also be provided to subtraction logic 324 for subsequent reduction of a leakage component of the sampled mixed-down received-signal.

Figure 5:
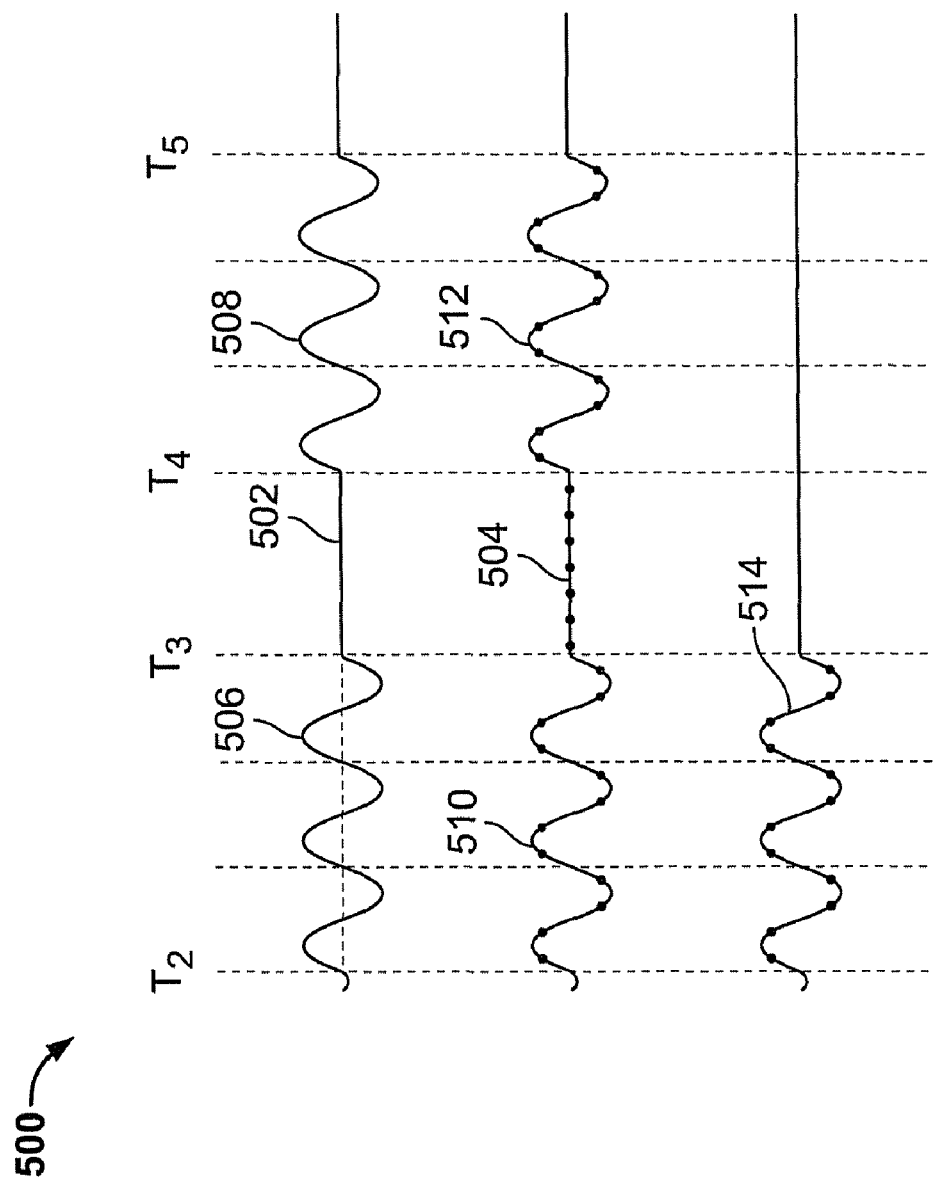
FIG. 5 depicts graphs of exemplary signals including a mixed-down received-signal and a sampled mixed-down received-signal, and an estimated leakage component.

Next, FIG. 5 depicts graphs 500 of a mixed-down received-signal 502, a sampled mixed-down received-signal 504, and an estimated leakage component 514. Mixed-down received-signal 502 may, for example, include the mixed-down received-signal produced by mixer 406, the filtered mixed-down received-signal produced by filter 408, the amplified filtered mixed-down received-signal produced by IF amplifier 410, or the sampled mixed-down received-signal produced by ADC 412. Mixed-down received-signal 502 includes (i) a mixed-down leakage component 506 that corresponds to a leakage component (e.g., leakage component 208), and (ii) a mixed-down target component 508 that corresponds to a target component (e.g., target component 210). Sampled mixed-down received-signal 504 includes (i) a sampled mixed-down leakage component 510 that corresponds to a leakage component (e.g., leakage component 506), and (ii) a sampled mixed-down target component 512 that corresponds to a target component (e.g., target component 508). The circular points on the graph of signal 504 represent sampled values of mixed-down received-signal 502.

Processor 304 may determine which values of sampled mixed-down received-signal 504 should be stored as estimated leakage component 326. For example, processor 304 may detect when transmit antenna 108 begins transmitting transmit-signal 102 (e.g., time $T_0$) and add to time $T_0$ the amount of time indicated by first time threshold 316. In this way, processor 304 determines to store values of sampled mixed-down received-signal 504, from time $T_0$ to time $T_0$ plus first time threshold 316, as estimated leakage component 326. As another example, processor 304 may determine to store values of sampled mixed-down received-signal from time $T_2$ to time $T_3$ as estimated leakage component 326. Time $T_3$ may equal time $T_0$ plus first time threshold 316. In accordance with this example, the estimated leakage component 326 may include the sampled values of estimated leakage component 514. Other examples of processor 304 determining which values of sampled mixed-down received-signal 504 should be stored as estimated leakage component 326 are also possible.

Next, FIG. 6 is a block diagram illustrating details of subtraction logic 324 in accordance with an exemplary embodiment. As illustrated in FIG. 6, subtraction logic 324 includes an inverter 602 and an adder 604. Inverter 602 may comprise a sign inverter, an input terminal, and an output terminal. The input terminal of inverter 602 may be connected to data storage 306 so as to be able to receive a reduction leakage component (e.g., determined reduction leakage component 322). Inverter 602 may invert the reduction leakage component so as to produce an inverted reduction leakage component.

Adder 604 may be connected to ADC 412 via connection mechanism 308 so as to receive the ADC output signal, and to inverter 602 via a connection mechanism 606 so as to receive the inverted reduction leakage component. Adder 604 may add the inverted reduction leakage component to the ADC output signal so as to produce a modified received-signal (or a modified sampled mixed-down received-signal) that substantially excludes a leakage component. Since a sampled mixed-down received-signal may include a sampled mixed-down leakage component and a sampled mixed-down target component, for example, adder 604 may determine where to add the inverted reduction leakage component so as to substantially cancel out the leakage component of the sampled mixed-down received-signal. For example, adder 604 may add the inverted reduction leakage component to the sampled mixed-down received-signal 504 at a point corresponding to the start-receive time $T_2$. Processor 304 may use the modified received-signal to determine an altitude of vehicle 102 and/or for other purposes. Additionally or alternatively, subtraction logic 324 could be arranged as program instructions of computer-readable program instructions 314. Other examples of subtraction logic 324 are also possible.

Figure 7:
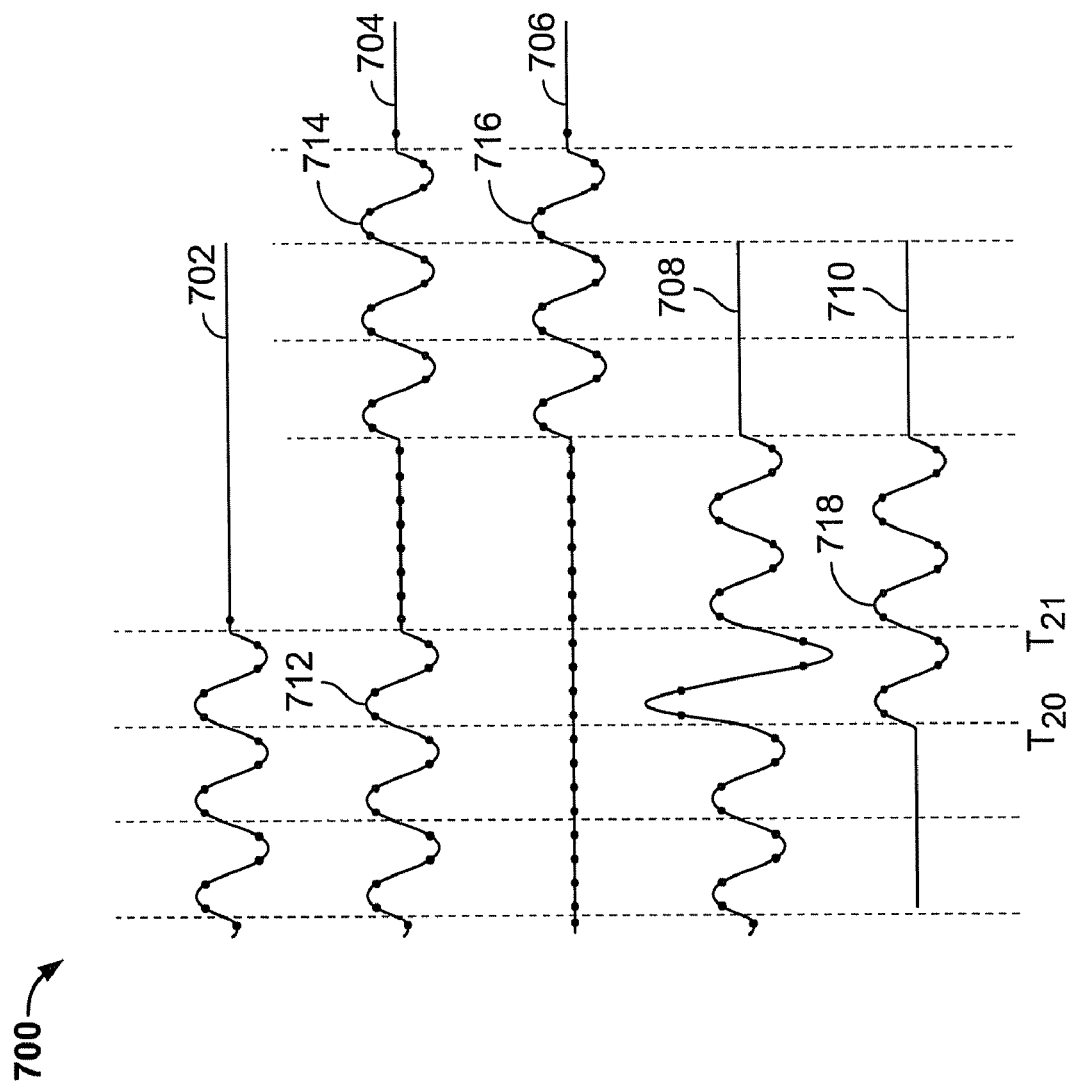
FIG. 7 depicts graphs of an exemplary leakage component, and exemplary signals including a first sampled mixed-down received-signal, a first modified received-signal, a second sampled mixed-down received-signal, and a second modified received-signal.

Next, FIG. 7 depicts graphs 700 of a reduction leakage component 702, a mixed-down received-signal 704, a modified received-signal 706, a mixed-down received-signal 708, and a modified received-signal 710. The circular points on each of the graphs 700 represent sampled values of signals 702, 704, 706, 708, 710. Some or all of the sampled values may be stored at data storage 306. For example, the sampled values of reduction leakage component 702 may be stored as determined reduction leakage component 322.

Reduction leakage component 702 may be based, at least in part, on leakage component 208 and/or one or more other leakage components. Mixed-down received-signal 704 may be a mixed-down received-signal produced at ADC 412 in response to received-signal 240 being received at and/or passing through receiver 312. Mixed-down received-signal 704 includes a leakage component 712 that corresponds to leakage component (e.g., leakage component 236), and a target component 714 that corresponds to target component (e.g., target component 238). Subtraction logic 324 may subtract reduction leakage component 702 from mixed-down received-signal 704 so as to produce modified received-signal 706. Modified received-signal 706 includes a target component 716 corresponding to target component 714 and substantially excludes leakage component 712. Subtraction logic 324 may carry out subtraction of reduction leakage component 702 by inverting reduction leakage component 702 at inverter 602 and then adding the inverted reduction leakage component to mixed-down received-signal 704.

Mixed-down received-signal 708 may be produced at ADC 412 in response to receiving another received-signal being received at and/or passing through receiver 312. Mixed-down received-signal 708 includes a leakage component and a target component that overlaps with a portion of the leakage component near the trailing edge of the leakage component (e.g., the portion of a leakage component from time $T_{20}$ to time $T_{21}$). Subtraction logic 324 may subtract reduction leakage component 702 from mixed-down received-signal 708 so as to produce modified received-signal 710. Modified received-signal 710 includes a target component 718 that corresponds to the target component of mixed down received-signal 708 and substantially excludes the leakage component of mixed down received-signal 708.

3. Exemplary Operation

Figure 8:
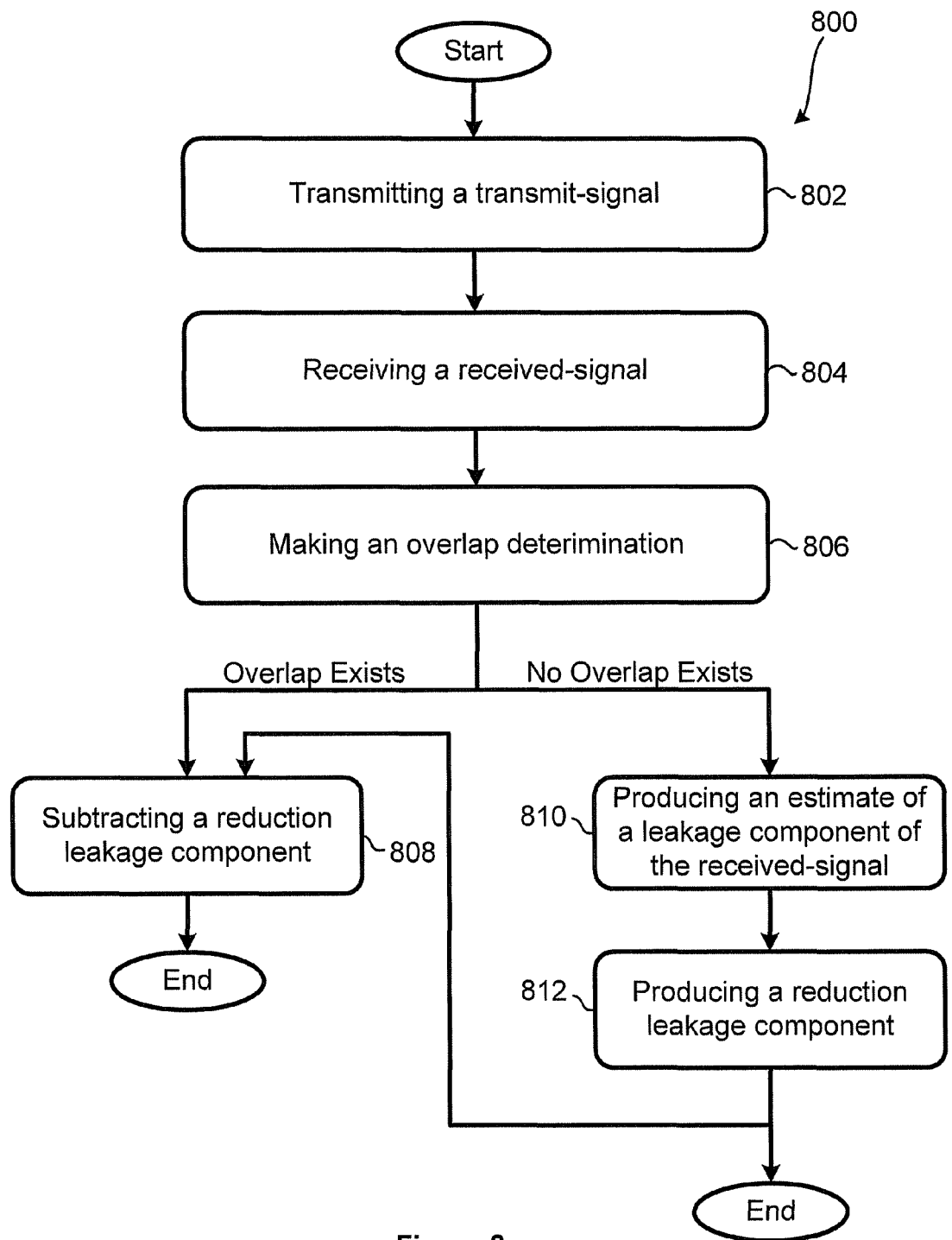
FIG. 8 is a flow diagram depicting a set of functions that may be carried out in accordance with an exemplary method and/or system.

Next, FIG. 8 is a flow chart provided to illustrate a set of functions 800 that may be carried out in accordance with an exemplary embodiment described herein. Radar system 104 may carry out the set of functions 800 so as to reduce a leakage component of a received-signal. One or more functions of the set of functions 800 may be repeated so as to reduce the leakage components of other received-signals. Additionally, two or more of the functions shown in FIG. 8 may be carried out simultaneously.

As shown in FIG. 8, block 802 includes transmitting a transmit-signal, such as transmit-signal 202, via transmit antenna 106 and/or transmitter 310. Processor 304 may cause transmitter 310 to generate transmit-signal 202, as well as to generate one or more transmit-signals that are transmitted prior to transmission of transmit-signal 202 and/or one or more transmit-signals that are transmitted after transmission of transmit-signal 202. Processor 304 can determine a transmit time of each leading edge of a transmit-signal (e.g. leading edge 212) and a transmit time of each trailing edge of a transmit-signal (e.g., trailing edge 214). Processor 304 can also determine a plurality of other transmit times that occur during transmission of the transmit-signal.

Each transmit-signal transmitted by transmit antenna 106 is transmitted at any one of a variety of power levels. Processor 304 can determine the power level of each transmit-signal. This power level determination may be made, for example, by determining the power level requested by processor 304 and/or by measuring the power level of the transmitted-signal (e.g., a portion of the transmit-signal may be provided as a feedback signal to processor 304). Processor 304 can also determine whether the power level of the transmit-signal is within a power level range corresponding to a reduction leakage component (e.g., reduction leakage component 322).

Next, block 804 includes receiving a received-signal, such as received-signal 204, via receive antenna 108 and/or receiver 312. As received-signal 204 is being received, receiver 312 may provide received-signal 204 to processor 304. In this way, processor 304 can determine a receive time when leading edge 216 is received, a receive time when trailing edge 218 is received, a receive time when leading edge 220 is received, and a receive time when trailing edge 222 is received. Processor 304 can also determine receive times corresponding to any other portion of the received-signal.

Next, block 806 includes making an overlap determination. The overlap determination may be made to determine whether the leakage component of the received-signal can be used to estimate a leakage component. Making the overlap determination may be carried out in various ways. For example, making the overlap determination may include determining whether the target component of the received-signal overlaps any portion of the leakage component of the received-signal and/or determining whether any portion of the target component is received while any portion of the leakage component is being received.

As another example, making the overlap determination may include determining whether the receive time of the leading edge of target component 210 occurs during a time period in which processor 304 expects leakage component 208 to be received. If the receive time occurs during the time period in which processor 304 expects leakage component 208 to be received, then the determination is overlap exists, otherwise, overlap does not exist. The time period may, for example, be the period of time from time $T_0$ to time $T_0$ plus first threshold time 316.

As yet another example, making the overlap determination may include determining a time difference between the receive time of the leading edge of the target component (e.g., leading edge 220) and the transmit time of the leading edge of the transmit component (e.g., leading edge 212). In other words, making the overlap determination may include determining a time difference between time $T_4$ and time $T_0$. After determining the time difference, the time difference may be compared to first time threshold 316. If the time difference is greater than first time threshold 316, then the overlap determination is that target component 210 does not overlap leakage component 208. In other words, overlap does not exist. On the other hand, if the time difference is less than or equal to first time threshold 316, then the overlap determination is that at least a portion of target component 210 overlaps leakage component 208. In other words, overlap exists.

Next, block 808 includes subtracting a reduction leakage component from the received-signal so as to produce a modified received-signal. The modified received-signal may include the target component of the received-signal and substantially exclude the leakage component of the received-signal. The subtracted reduction leakage component may be default reduction leakage component 320 or reduction leakage component 322.

In one respect, subtracting the reduction leakage component from the received-signal may be carried out for each received-signal. As an example, prior to producing reduction leakage component 322, default reduction leakage component 320 may be subtracted from one or more received-signals. After reduction leakage component 322 is produced, default reduction leakage component 320 or reduction leakage component 322 may be subtracted from each subsequently received received-signal.

In another respect, subtracting the reduction leakage component from the received-signal may be carried out for only some of the received-signals. As an example, the reduction leakage component may be subtracted only from the received-signals for which the overlap determination is that overlap exists, whereas the reduction leakage component may not be subtracted from the received-signals for which the overlap determination is that overlap does not exist.

In yet another respect, subtracting the reduction leakage component from the received-signal may include subtracting a scaled reduction leakage component. A scaled reduction leakage component may be subtracted from a received-signal when the detected power level of the transmit-signal corresponding to the received-signal is not within a given power level range corresponding to default reduction leakage component 320 and/or determined reduction leakage component 322.

For example, if reduction leakage component 322 corresponds to transmit-signals within a power level range of 1,900 watts to 2,100 watts (i.e., a power level range centered at 2,000 watts) and if the transmit-signal is transmitted at 1,000 watts, then processor 304 may determine that the power level of the transmit-signal is not within the power level range of reduction leakage component 322. After making this determination, processor 304 may determine a ratio of the power level of the transmit-signal and the power level of reduction leakage component 322 (e.g. a ratio of 1,000 watts divided by 2,000 watts (i.e., 0.5)) and a square root of the ratio. After determining the square root of the ratio, processor 304 may scale reduction leakage component 322. For instance, processor 304 may multiply each sampled value of reduction leakage component 322 by the square root of the ratio. Upon scaling the sampled values, processor 304 and/or subtraction logic 324 may begin subtracting the scaled values from the received-signal so as to produce a modified received-signal.

In accordance with the example in which the transmit-signal is transmitted at 1,000 watts, if reduction leakage component 322 corresponds to transmit-signals transmitted at 1,000 watts, then processor 304 may determine that the transmit-signal is within the power level range of reduction leakage component 322. In this case, reduction leakage component 322 may be subtracted from the received-signal without scaling reduction leakage component 322.

Next, block 810 includes producing an estimate of the leakage component, such as an estimate of leakage component 208. Producing the estimate may be carried out in response to determining that target component of the received-signal does not overlap the leakage component of the received-signal. As an example, producing the estimate may be carried out in response to determining that the time difference between the receive time of leading edge 220 and the transmit time of leading edge 212 is greater than first time threshold 316. As another example, producing the estimate may be carried out in response to determining that the time difference between the receive time of leading edge 220 and the transmit time of leading edge 212 is greater than first time threshold 316 and less than or equal to second time threshold 318.

Producing the estimate of the leakage component may be carried out in various ways. For example, producing the estimate may include ADC 412 sampling (i) the received-signal or some version of the received-signal (e.g., mixed-down received-signal 502), and/or (ii) at least a portion of the received-signal or at least a portion of some version of the received-signal, such as a portion of signal 502 where leakage component 506 is expected to be received. As each sample is obtained, ADC 412 may provide the obtained sample to data storage 306 for storage as part of estimated leakage component 326.

One of ordinary skill in the art will understand that the functions of producing an estimate of the leakage component may be carried out for a plurality of received-signals, such as a plurality of received-signals that are received at receiver 312 prior to reception of received-signal 204 and/or a plurality of received-signals that are received at receiver 312 after reception of received-signal 204. The plurality of estimated leakage component may be stored as estimated leakage component 326 and used to determine reduction leakage component 322.

Next, block 812 includes producing a reduction leakage component (e.g., determined reduction leakage component 322). Block 812 may be carried out if the overlap determination is that target component 210 does not overlap leakage component 208. Producing the reduction leakage component may be carried out in response to producing the estimate of the leakage component. As an example, producing the reduction leakage component may include storing the set of sampled values of estimated leakage component 514 as reduction leakage component 322.

As another example, producing the reduction leakage component may include determining an average estimated leakage component that is based on a sum of sampled values of a plurality of estimated leakage components (e.g., estimated leakage component 514 and the estimated leakage component of at least one other received-signal). The summed sampled values correspond to common sample times. For purposes of this description, a common sample time refers to a common amount of time relative to a reference time, such as a transmit time of a leading edge of a transmit component corresponding to the received-signal being sampled.

Table 1 depicts (i) sampled values of a set of estimated leakage components (i.e., estimated leakage component #1, estimated leakage component #2, and estimated leakage component #3) for seven common sampled times (ST) (i.e., ST1, ST2, ST3, ST4, ST5, ST6 and ST7), and (ii) an average estimated leakage component based on the set of estimated leakage components. As the values of the average estimated leakage component are being determined, the values may be stored in data storage 306 as determined reduction leakage component 322.

TABLE 1

| Sample Time | ST1 | ST2 | ST3 | ST4 | ST5 | ST6 | ST7 |
|---|---|---|---|---|---|---|---|
| Est. Leak. Comp. #1 | 0.93 | 0.95 | −0.94 | −0.94 | 0.99 | 1.00 | −1.03 |
| Est. Leak. Comp. #2 | 1.02 | 1.01 | −0.97 | −1.03 | 0.94 | 1.06 | −1.06 |
| Est. Leak. Comp. #3 | 0.93 | 0.98 | −1.02 | −0.94 | 0.95 | 1.04 | −0.97 |
| Ave. Est. Leak. Comp. | 0.96 | 0.98 | −0.97 | −0.97 | 0.96 | 1.03 | −1.02 |

A person having ordinary skill in the art will understand that an average estimated leakage component may be based on a number of sampled times other than seven sampled times such that the average estimated leakage component includes a number of values other than seven values. Additionally, a person having ordinary skill in the art will understand that an average estimated leakage component may be based on set of estimated leakage components that include a number of estimated leakage components other than three.

Additionally, in the case in which no overlap exists, FIG. 8 depicts subtracting a reduction leakage component (i.e., block 808) being carried out after producing the reduction leakage component (i.e., block 812). Alternatively, when no overlap exists, the reduction leakage component could be subtracted at another time relative to producing the reduction leakage component, such as at a time prior to producing the estimated leakage component or after producing the estimated leakage component and prior to producing the reduction leakage component.

4. Conclusion

Exemplary methods and systems are disclosed for reducing a leakage component of a received-signal. Reducing (e.g., by removing) the leakage component of a received-signal allows an operator (or system, more generally) to more accurately derive information from the received-signal. In radar-altimeter systems, reducing a leakage component of a received-signal may enable an operator to more accurately determine an aircraft's altitude, particularly at lower altitudes where a leakage component and a target component may combine to form a single waveform in the received-signal.

Those skilled in the art will understand, however, that changes and modifications may be made to the described embodiments without departing from the true scope and spirit of the present invention, which is defined by the claims.

Finally, the word "exemplary" is used herein to mean "serving as an example, instance, or illustration." Any embodiment described herein as "exemplary" is not necessarily to be construed as preferred or advantageous over other embodiments.

We claim:

1. A method for reducing a leakage component of a received-signal performed by a radar system having a transmit antenna and a receive antenna, the method comprising:
   transmitting a first transmit-signal via the transmit antenna, wherein the first transmit-signal includes a first transmit component, and wherein the first transmit component includes a first pulsed signal and a first transmit component leading edge that corresponds to a first transmit time;
   receiving a first received-signal via the receive antenna, wherein the first received-signal includes a first leakage component and a first target component, wherein the first target component includes a first target component leading edge that corresponds to a first receive time, and wherein the first received-signal corresponds to the first transmit-signal;
   determining a time difference between the first receive time and the first transmit time;
   determining whether the time difference between the first receive time and the first transmit time is greater than a first amount of time; and
   when the time difference between the first receive time and the first transmit time is greater than the first amount of time, producing an estimate of the first leakage component, and responsively producing a reduction leakage component based, at least in part, on the estimate of the first leakage component.

2. The method of claim 1, further comprising:
   transmitting a second transmit-signal via the transmit antenna;
   receiving a second received-signal via the receive antenna, wherein the second received-signal corresponds to the second transmit-signal, and wherein the second received-signal includes a second leakage component and a second target component; and
   subtracting the reduction leakage component from the second received-signal to produce a modified received-signal, wherein the modified received-signal includes the second target component and substantially excludes the second leakage component.

3. The method of claim 2,
   wherein the second transmit-signal includes a second transmit component,
   wherein the second transmit component includes a second pulsed signal and a second transmit component leading edge,
   wherein the second transmit component leading edge corresponds to a second transmit time,
   wherein the second target component includes a second target component leading edge, and
   wherein the second target component leading edge corresponds to a second receive time,
   the method further comprising:
   determining a time difference between the second receive time and the second transmit time; and
   determining whether the time difference between the second receive time and the second transmit time is less than or equal to the first amount of time,
   wherein subtracting the reduction leakage component from the second received-signal is carried out in response to determining that the time difference between the second receive time and the second transmit time is less than or equal to the first amount of time.

4. The method of claim 2,
   further comprising:
   determining whether the time difference between the first receive time and the first transmit time is less than a second amount of time,
   wherein producing the estimate of the first leakage component is only carried out when the time difference between the first receive time and the first transmit time is both greater than the first amount of time and less than the second amount of time.

5. The method of claim 1,
   wherein the first leakage component is within a radio frequency range,
   wherein producing the estimate of the first leakage component includes:
   (i) mixing down at least a portion of the first received-signal to produce a mixed-down received-signal within an intermediate frequency range, wherein the at least a portion of the first received-signal includes the first leakage component; and
   (ii) sampling the mixed-down received-signal to obtain a set of data that corresponds to the first leakage component,
   wherein the estimate of the first leakage component includes the set of data.

6. The method of claim 1, further comprising:
   prior to transmitting the first transmit-signal,
   (i) transmitting at least one other transmit-signal via the transmit antenna, wherein each transmit-signal of the at least one other transmit-signal includes a respective transmit component, wherein each respective transmit component includes a respective pulsed signal and a respective transmit component leading edge, and wherein each respective transmit component leading edge corresponds to a respective transmit time,
   (ii) receiving at least one other received-signal via the receive antenna, wherein each received-signal of the at least one other received-signal corresponds to a respective transmit-signal of the at least one other transmit-signal, wherein each received-signal of the at least one other received-signal includes a respective leakage component and a respective target component, wherein each target component of the at least one other received-signal includes a respective target component leading edge, and wherein each respective target component leading edge corresponds to a respective receive time, and (iii) for each received-signal of the at least one other received-signal and the corresponding transmit-signal, making a determination of whether the transmit time of the corresponding transmit-signal and the receive time of the received-signal are within a threshold time-period, wherein if the determination is that the transmit time of the corresponding transmit-signal and the receive time of the received-signal are within threshold time-period, then associating the received-signal with a leakage set, wherein the producing the reduction leakage component includes determining an average estimated leakage component based on sums of sampled values of the estimate of the first leakage component and a respective estimate of the leakage component of each received-signal that is associated with the leakage set.

7. The method of claim 1, further comprising:

wherein the first transmit-signal is transmitted at a first transmit power level;

transmitting a second transmit-signal via the transmit antenna, wherein the second transmit signal includes a pulsed signal and is transmitted at a second transmit power level;

receiving a second received-signal via the receive antenna, wherein the second transmit-signal corresponds to the second received-signal, and wherein the second received-signal includes a second leakage component and a second target component;

determining a square root of a ratio of the first transmit power level and the second transmit power level;

scaling the reduction leakage component based on the square root of the ratio; and subtracting the scaled reduction leakage component from the second received signal to produce a modified received-signal, wherein the modified received-signal includes the second target component and substantially excludes the second leakage component.

8. The method of claim 7, further comprising:

producing a second estimate of the second leakage component;

wherein the second received-signal includes at least a portion of energy of the second transmit-signal; and wherein producing the reduction leakage component includes determining an average estimated leakage component based on sums of sampled values of the first estimate of the first leakage component and the second estimate of the second leakage component.

9. The method of claim 1, wherein the transmit antenna and the receive antenna are the same antenna.

10. A system for reducing a leakage component of a received-signal, the system comprising:

a transmit antenna configured to transmit a first transmit-signal, wherein the first transmit-signal is a pulsed signal, wherein the first transmit-signal includes a first transmit component that includes a first transmit leading edge, and wherein the first transmit leading edge corresponds to a transmit time;

a receive antenna configured to receive a first received-signal, wherein the first received-signal includes a first leakage component and a first target component, wherein the first target component includes a first target leading edge, and wherein the first target leading edge corresponds to a receive time; and a processor configured to (i) determine a time difference between the transmit time and the receive time, (ii) determine whether the time difference is greater than a first amount of time, (iii) produce an estimate of the first leakage component when the time difference is greater than the first amount of time, and (iv) produce a reduction leakage component, based at least in part, on the estimate of the first leakage component.

11. The system of claim 10, wherein the transmit antenna is further configured to transmit a plurality of other transmit-signals, wherein each transmit-signal of the plurality of other transmit-signals includes a respective pulsed signal, wherein the received antenna is further configured to receive a plurality of other received-signals, wherein each received-signal of the plurality of other received-signals corresponds to a respective transmit-signal of the plurality of other transmit-signals, wherein each received-signal of the plurality of other received-signals includes a respective leakage component, wherein the processor is further configured to produce a respective estimate of the leakage component of each received-signal of the plurality of other received-signals, and wherein the reduction leakage component is further based on the respective estimates of the leakage components of each received-signal of the plurality of received-signals.

12. The system of claim 10, wherein the receive antenna is further configured to receive one or more other received-signals after the receive antenna receives the first received-signal, wherein each of the other received-signals includes (i) a respective leakage component, and (ii) a respective target component that corresponds to the respective leakage component, wherein the processor is further configured to subtract the reduction leakage component from each received-signal of the one or more other received-signals to produce a respective modified received-signal based on that received-signal of the one or more other received-signals, and wherein each of the modified received-signals includes a respective target component and substantially excludes the leakage component that corresponds to the target component.

13. The system of claim 12, wherein, for at least one received-signal of the one or more other received-signals, the leakage component of the at least one received-signal overlaps with the target component of the at least one received-signal, and wherein, for at least one other received-signal of the one or more other received signals, the leakage component of the at least one other received-signal does not overlap with the target component of the at least one other received-signal.

14. The system of claim 10, wherein the transmit antenna transmits a second transmit-signal, wherein the receive antenna receives a second received-signal, and wherein the second received-signal includes a second leakage component and a second target component, wherein the processor is further configured to subtract the reduction leakage component from the second received-signal to produce a modified received-signal, and wherein the modified received-signal includes the second target component and substantially excludes the second leakage component.

15. The system of claim 10, wherein the first transmit-signal is transmitted at a first transmit power level;
- wherein the transmit antenna is further configured to transmit a second transmit-signal, wherein the second transmit-signal is a pulsed signal and is transmitted at a second transmit power level;
- wherein the receive antenna is further configured to receive a second received-signal, wherein the second transmit-signal corresponds to the second received-signal, and wherein the second received-signal includes a second leakage component and a second target component;
- wherein the processor is further configured to (v) determine a square root of a ratio of the first transmit power level and the second transmit power level, (vi) scale the reduction leakage component based on the square root of the ratio, and (vii) subtract the scaled reduction leakage component from the second received signal to produce a modified received-signal, wherein the modified received-signal includes the second target component and substantially excludes the second leakage component.

16. The system of claim 15, wherein the processor is further configured to produce a second estimate of the second leakage component, wherein the second received-signal includes at least a portion of energy of the second transmit-signal, and wherein to produce an estimate of the first leakage component, the processor is further configured to determine an average estimated leakage component based on sums of sampled values of the first estimate of the first leakage component and the second estimate of the second leakage component.

17. The system of claim 10, wherein the transmit antenna and the receive antenna are the same antenna.

18. A method for reducing a leakage component of a received-signal performed by a radar system having a transmit antenna and a receive antenna, the method comprising:
- transmitting a given transmit-signal at a first power level via the transmit antenna, wherein the given transmit-signal includes a pulsed signal;
- receiving a given received-signal via the receive antenna, wherein the given received-signal includes a leakage component and a target component, and wherein the given received-signal corresponds to the given transmit-signal; and
- producing an estimate of the leakage component of the given received-signal and responsively producing a reduction leakage component based, at least in part, on the estimate of the leakage component of the given received-signal;
- transmitting another transmit-signal via the transmit antenna, wherein the other transmit-signal includes a pulsed signal and is transmitted at a second transmit power level;
- receiving another received-signal via the receive antenna, wherein the other transmit-signal corresponds to the other received-signal, and wherein the other received-signal includes another leakage component and another target component;
- determining a square root of a ratio of the first transmit power level and the second transmit power level;
- scaling the reduction leakage component based on the square root of the ratio; and
- subtracting the scaled reduction leakage component from the other received signal to produce a modified received-signal, wherein the modified received-signal includes the other target component and substantially excludes the other leakage component.

19. The method of claim 18, further comprising:
- producing a respective estimate of the another leakage component of the another received-signal,
- wherein the given received-signal includes at least a portion of energy of the given transmit-signal,
- wherein the another received-signal includes at least a portion of energy of the another transmit-signal,
- wherein producing the reduction leakage component includes determining an average estimated leakage component based on sums of sampled values of the estimate of the leakage component of the given received-signal and the estimate of the another leakage component of the another received-signal.

20. The method of claim 19, further comprising:
- detecting a respective transmit power level associated with the given transmit-signal and with the another transmit-signal,
- wherein each transmit power level indicates a transmit power at which the associated transmit-signal is transmitted, and
- wherein the transmit power levels are all within a given range of power levels.

* * * * *